(12) United States Patent
Strutin-Belinoff et al.

(10) Patent No.: US 9,588,674 B2
(45) Date of Patent: Mar. 7, 2017

(54) METHODS AND SYSTEMS FOR PROVIDING AN AUTOMATED SPLIT-SCREEN USER INTERFACE ON A DEVICE

(71) Applicant: QUALCOMM Incorporated, San Diego, CA (US)

(72) Inventors: Pilar Ariella Strutin-Belinoff, Oakland, CA (US); Benjamin Andrew Rottler, San Francisco, CA (US); Gregory Robert Arroyo, San Francisco, CA (US); Itai Vonshak, Palo Alto, CA (US)

(73) Assignee: QUALCOMM Incorporated, San Diego, CA (US)

( * ) Notice: Subject to any disclaimer, the term of this patent is extended or adjusted under 35 U.S.C. 154(b) by 141 days.

(21) Appl. No.: 13/690,758

(22) Filed: Nov. 30, 2012

(65) Prior Publication Data
US 2014/0157163 A1 Jun. 5, 2014

(51) Int. Cl.
*G06F 3/048* (2013.01)
*G06F 3/0488* (2013.01)
*G01C 21/36* (2006.01)

(52) U.S. Cl.
CPC ..... *G06F 3/04883* (2013.01); *G01C 21/3664* (2013.01); *G06F 2203/04803* (2013.01)

(58) Field of Classification Search
CPC .............................. G06F 3/0486; G06F 9/4445
USPC ......................................... 715/781, 792, 788
See application file for complete search history.

(56) References Cited

U.S. PATENT DOCUMENTS

| | | | |
|---|---|---|---|
| 2003/0076362 A1* | 4/2003 | Terada | G06F 3/0486 715/781 |
| 2005/0076019 A1* | 4/2005 | Jackson et al. | 707/3 |
| 2007/0226647 A1* | 9/2007 | Louch | 715/788 |
| 2008/0115064 A1* | 5/2008 | Roach et al. | 715/730 |
| 2008/0256443 A1* | 10/2008 | Li | G06F 3/0486 715/700 |
| 2009/0064057 A1 | 3/2009 | Bull et al. | |
| 2011/0144970 A1* | 6/2011 | Jiang et al. | 703/24 |
| 2011/0175930 A1* | 7/2011 | Hwang et al. | 345/629 |
| 2012/0081267 A1 | 4/2012 | Sirpal et al. | |
| 2012/0290966 A1* | 11/2012 | Chae | G09G 5/14 715/778 |
| 2013/0305184 A1* | 11/2013 | Kim et al. | 715/781 |

OTHER PUBLICATIONS

"iOS: Understanding Multitasking"; Apr. 11, 2012; 2 pages.
Vaughan-Nichols, S.J.; "Google's new Chrome OS: Back to the future"; Apr. 10, 2012; 9 pages.

\* cited by examiner

*Primary Examiner* — Anil N Kumar
(74) *Attorney, Agent, or Firm* — Norton Rose Fulbright US LLP (57) ABSTRACT

Embodiments of the present invention disclose a split-screen user interface for a computer device. According to one embodiment, a primary application is displayed on a display associated with the computing device in a first viewing mode. Upon receiving a request from the user to launch to a split-screen operating mode for enabling simultaneous display of multiple applications, the first viewing mode is transitioned to a split-screen view such that the primary application is shown within a first display area and a plurality of applications are shown within a second display area adjacent to the first display area.

13 Claims, 6 Drawing Sheets

METHODS AND SYSTEMS FOR PROVIDING AN AUTOMATED SPLIT-SCREEN USER INTERFACE ON A DEVICE

BACKGROUND

The ability to provide efficient and intuitive interaction between computer systems and users thereof is essential for delivering an engaging and enjoyable user-experience. Graphical user-interfaces (GUI) are commonly used for facilitating interaction between an operating user and the computing system. Generally, a GUI includes an input means for allowing a user to manipulate objects shown on an associated display, and an output means for allowing the computer system to indicate the effects of the manipulation. Today, most computer systems employ icon-based user interfaces that utilize icons and menus for assisting a user in navigating and launching content and applications on the computing system.

BRIEF DESCRIPTION OF THE DRAWINGS

The features and advantages of the inventions as well as additional features and advantages thereof will be more clearly understood hereinafter as a result of a detailed description of particular embodiments of the invention when taken in conjunction with the following drawings in which.

DETAILED DESCRIPTION OF THE INVENTION

The following discussion is directed to various embodiments. Although one or more of these embodiments may be discussed in detail, the embodiments disclosed should not be interpreted, or otherwise used, as limiting the scope of the disclosure, including the claims. In addition, one skilled in the art will understand that the following description has broad application, and the discussion of any embodiment is meant only to be an example of that embodiment, and not intended to intimate that the scope of the disclosure, including the claims, is limited to that embodiment. Furthermore, as used herein, the designators "A", "B" and "N" particularly with respect to the reference numerals in the drawings, indicate that a number of the particular feature so designated can be included with examples of the present disclosure, The designators can represent the same or different numbers of the particular features.

The figures herein follow a numbering convention in which the first digit or digits correspond to the drawing figure number and the remaining digits identify an element or component in the drawing. Similar elements or components between different figures may be identified by the user of similar digits. For example, 143 may reference element "43" in FIG. 1, and a similar element may be referenced as 243 in FIG. 2. Elements shown in the various figures herein can be added, exchanged, and/or eliminated so as to provide a number of additional examples of the present disclosure. In addition, the proportion and the relative scale of the elements provided in the figures are intended to illustrate the examples of the present disclosure, and should not be taken in a limiting sense.

Typically, an operating user must activate an icon or link to launch each application they wish to view (e.g., email application, etc.) and then toggle between applications and/or instances of applications by minimizing and maximizing each associated application window. When multitasking, which involves working and/or viewing multiple applications or tasks at once, a user may physically resize an application window so that it can be viewed on the interface simultaneously with another application window. However, this method usually requires a number of object movements (i.e., mouse drag) and resizing efforts from the user. For example, Microsoft Windows® enables a multi-tasking, split-screen operating environment by requiring the user to maximize two application windows, and then hold down the left mouse button while dragging one of the application windows to one side of the display screen. Other solutions utilize similar methods as described above that require time-consuming sizing steps by the operating user, which becomes increasingly difficult to manage as more applications are added to the multi-tasking environment. Thus, there is a need in the art for system and method that provides an automated and intuitive split-screen user interface capable of supporting a single viewpoint for a plurality of applications so as to effectively maximize the available real estate of the associated display and user interface.

Examples of the present invention provide a split-screen user interface for navigating and launching applications on a computing system. According to one example embodiment, a single application and full-screen viewing mode may be separated and split into two separate modules such that one viewing area populates applications within a first display window area while one or more additional applications are populated within a second display window area adjacent to the first display window area. Moreover, the application on the left-hand side of the screen may be "pinned" or placed in a fixed state, while the display window on the right-hand side dynamically updates as applications are added and closed. This dual-tasking environment allows users to work within multiple applications simultaneously without having to toggle between applications or leave the full-screen viewing mode.

Figure 1:
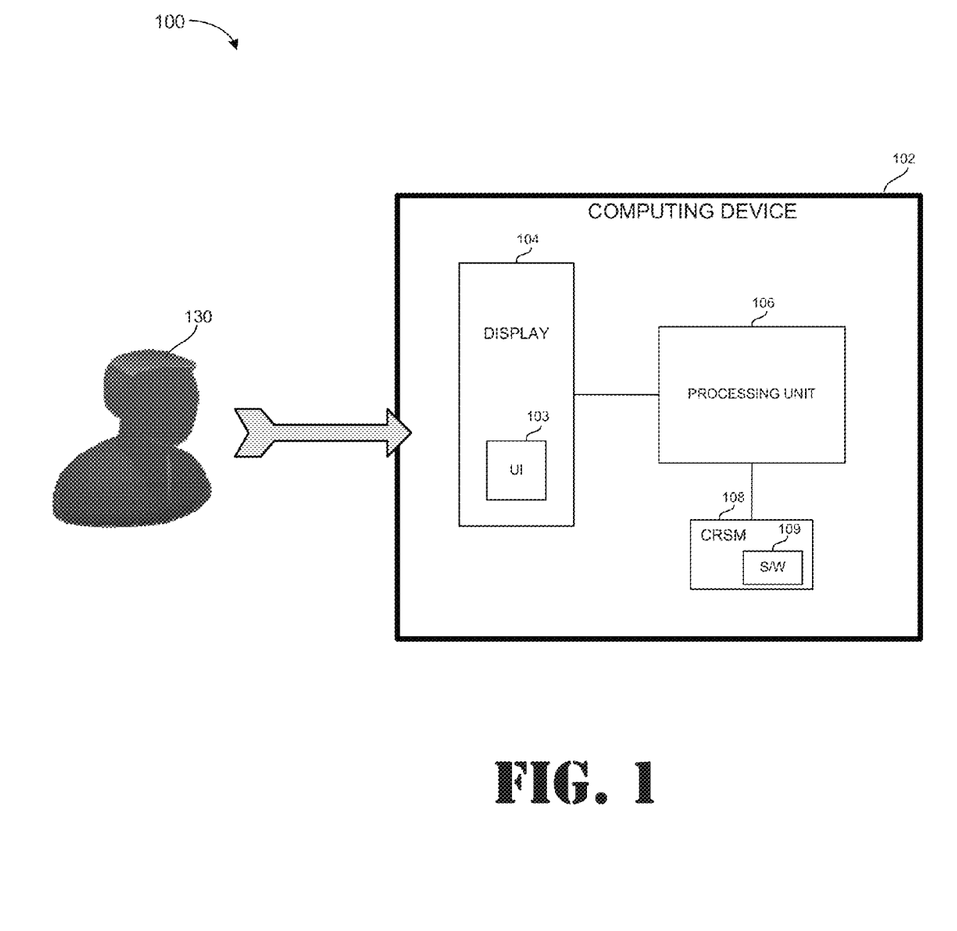
FIG. 1 is a simplified block diagram of a system for providing a split-screen user interface according to an example of the present invention.

Referring now in more detail to the drawings in which like numerals identify corresponding parts throughout the views, FIG. 1 is a simplified block diagram of a system for providing a split-screen user interface according to an example of the present invention. As shown in this example, the system 100 includes a user 130 operating a computing device 102. Computing device 102 includes a processing unit 106, display 104 and user interface 103, and a non-transitory computer-readable storage medium 108. In one embodiment, processing unit 106 represents a central processing unit (CPU), microcontroller, microprocessor, or logic configured to execute programming instructions associated with the user interface 103. Display unit 104 represents an electronic visual display configured to display objects and a graphical user interface 103 for enabling input interaction between the user 130 and the computing device 102. That is, user interface 103 is configured to enable both a single application view mode and a split-screen operating mode for facilitating user interaction with multiple applications on the computing device 102. Still further, storage medium 108 represents non-transitory, volatile storage (e.g. random access memory), non-volatile (e.g. hard disk drive, read-only memory, compact disc read only memory, flash storage, etc.), or combinations thereof. Moreover, storage medium 108 includes software 109 that is executable by processor 106 and, that when executed, causes the processing unit 106 to perform some or all of the functionality described herein. For example, instructions for providing a split-screen user interface may be implemented as executable software within the storage medium 108.

Figure 2:
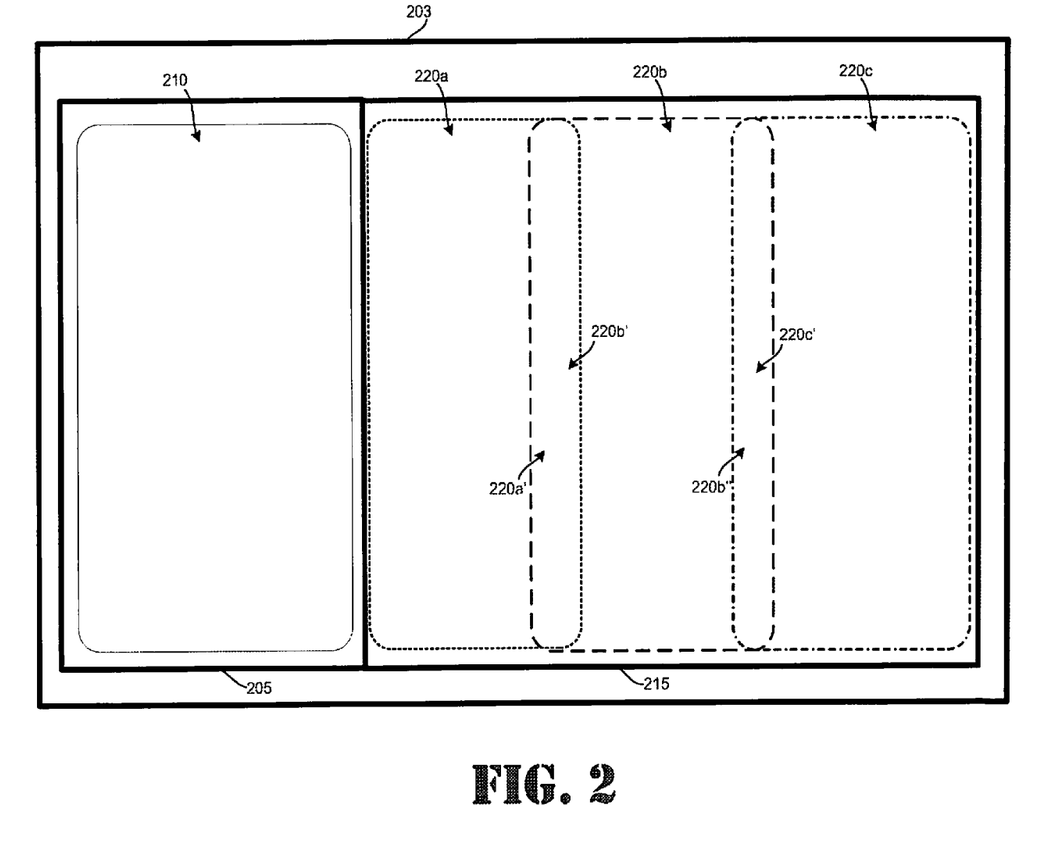
FIG. 2 is an illustration of multiple display areas and application windows within a split-screen user interface in accordance with an example of the present invention.

FIG. 2 is an illustration of multiple display areas and application windows within a split-screen user interface in accordance with an example of the present invention. As shown here, the user interface window 203 includes a first display area 205 and a second display area 215. More particularly, the first display area is utilized for displaying a first application window 210 associated with a primary application, while the second display area 215 is utilized for displaying a plurality of application windows 220a-220c associated with multiple applications. In the present example, the second display area 215 is positioned immediately adjacent to the first display area 205. According to one embodiment, since the second display area is configured to provide for display of multiple applications, the second display area 215 is larger in size than the first display area 205. For example, the size ratio of the first display area 205 to the second display area 215 may be one-third to two-thirds of the full width of the user interface window 203. In one embodiment, once the secondary application window 220a is launched within the second display area 215, each successive application window 220b and 220c overlap a portion of the preceding application (create application "stack"). For example, as shown in FIG. 2, user activation of a third application may cause a third application window 220b to automatically launch such that portion 220b' of application window 220b (associated with the third application) overlaps portion 220a' of application window 220a (associated with the second application). Similarly, if the user then desires to launch a fourth application, a fourth application window 220c automatically launches such that portion 220c' of application window 220c (associated with the fourth application) overlaps portion 220b" of application window 220b. However, this is only one example as the application windows may be configured to launch in various arrangements and/or modified manually by the user.

Figure 3A:
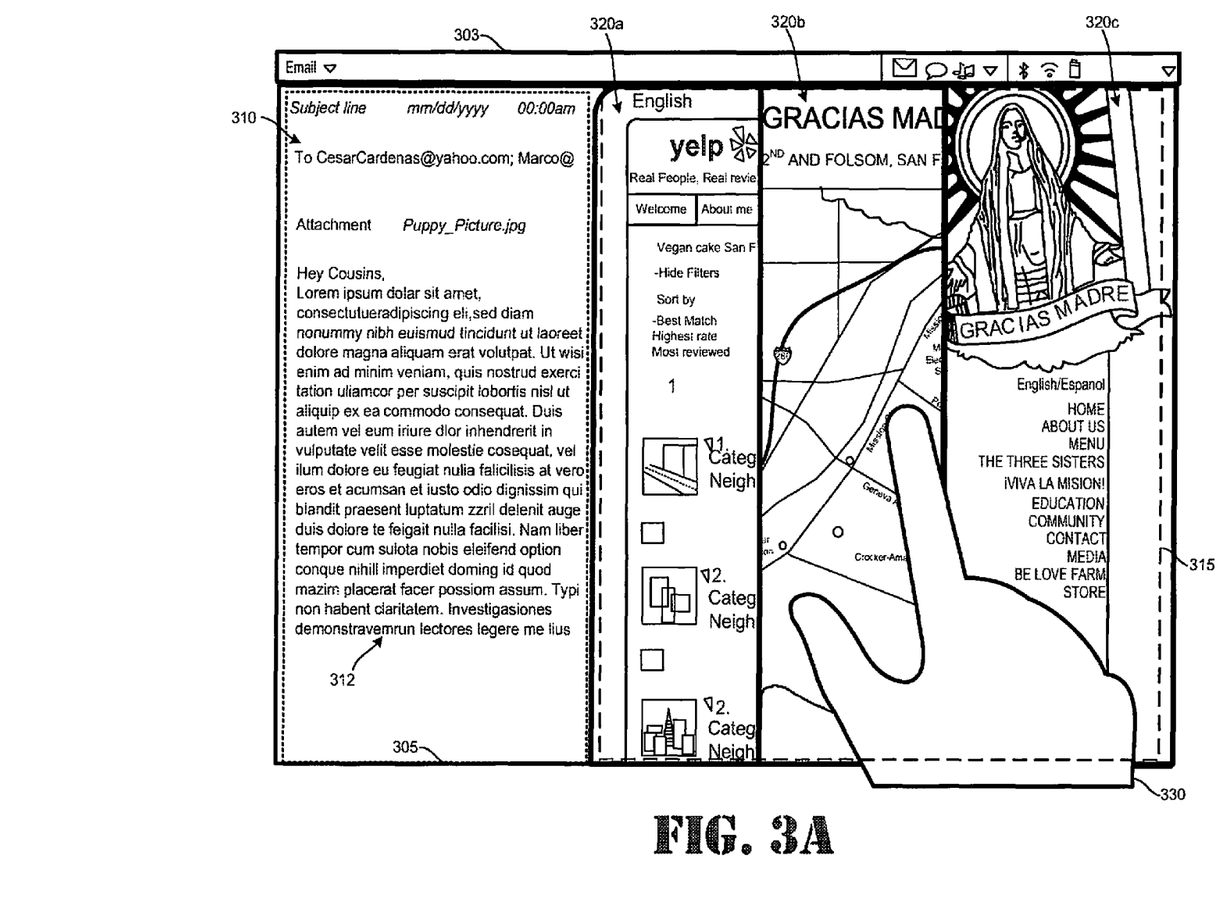
FIGS. 3A and 3B are screenshots of an operating environment utilizing the split-screen user interface in accordance with an example of the present invention
Figure 3B:
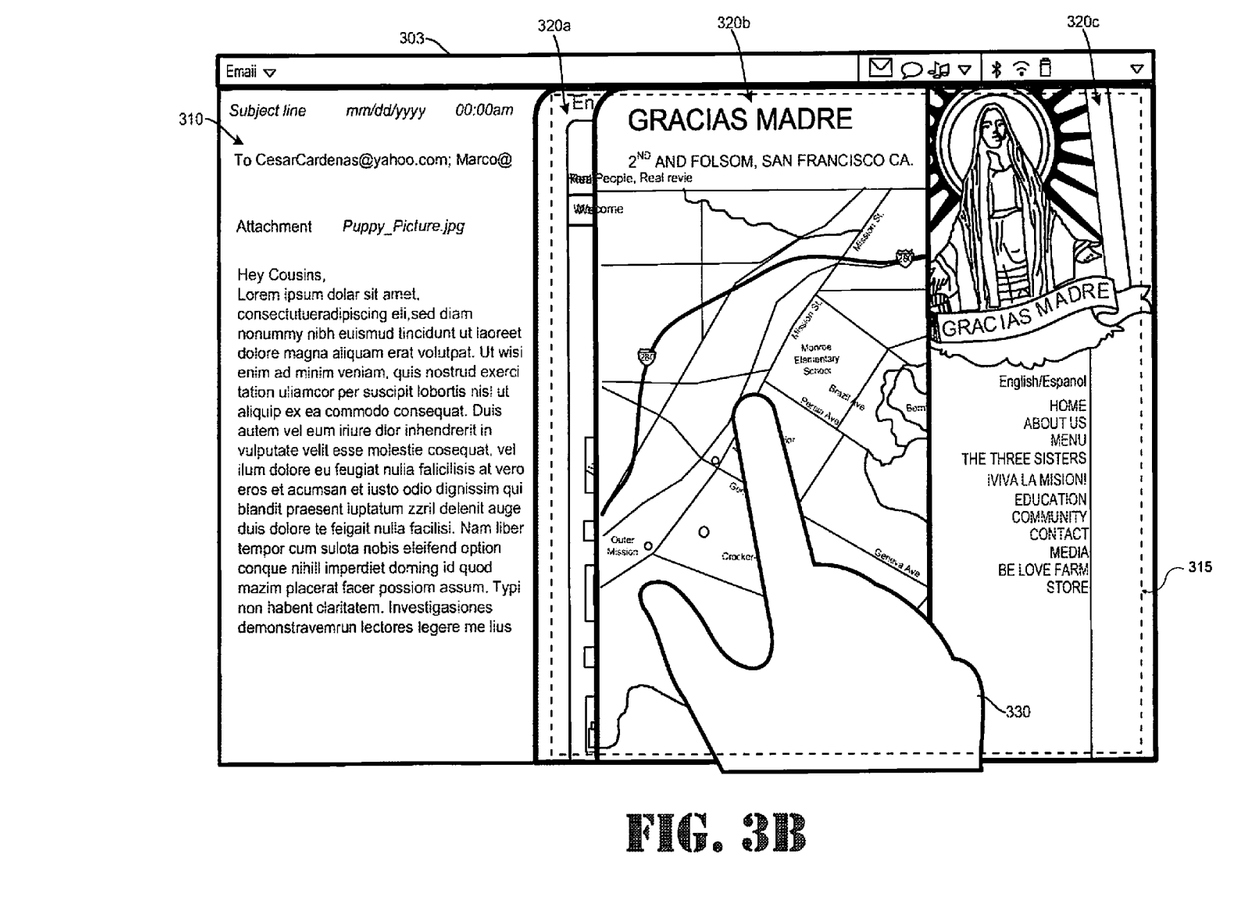

FIGS. 3A and 3B are screenshots of an operating environment utilizing the split-screen user interface in accordance with an example of the present invention. FIG. 3A depicts one example of a screenshot for providing a split-screen user interface. As shown here, the first display area 305 includes a first application window 310 displaying content 312 associated with a first application (e.g., email client). A second application and application window 320a may be activated and automatically launched in a second display area 315 through user activation of a link within the content 312 of the first application and application window 310. Here, an internet browser application and window 320a is launched within the second display area 315 of the split-screen user interface 303. Thereafter, a third application and window 320b may be launched with the second display area 315. For example, a user may view a list of restaurants shown within second application window 320a and upon clicking an HTML or similar link associated with one of the restaurants, a mapping application and window 320b that provides driving/walking directions to the selected restaurant may automatically launch adjacent to second application window 320a. By the same measure, the user 330 may then elect to launch another application and window 320c through interaction with any of the previously-opened application windows 310, 320a, and 320b. Moreover, the split-screen user interface 303 of the present embodiments enable each of the "stacked" application windows 320a-320c to be manipulated by the user. For example, and as shown in FIG. 3B, the operating user 330 may relocate (via touch, mouse interaction, or similar input means) the third application window 320b within the second display area 315 to substantially overlap the second application window 320a in order to provide a larger viewable area of the third application window 320b. In the present example, the third application window 320b now becomes active as the topmost application within the application "stack" of the second display area 315.

Figure 4:
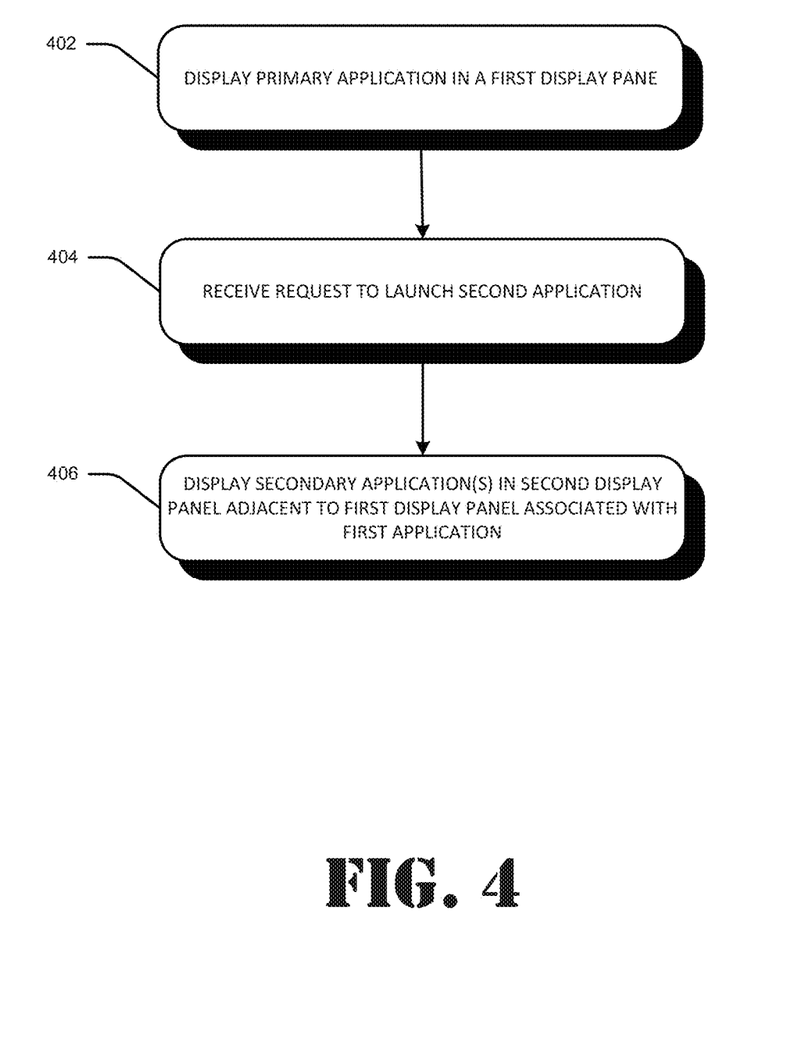
FIG. 4 is a simplified flow chart of the processing steps for enabling the split-screen user interface in accordance with one example of the present invention.

FIG. 4 is a simplified flow chart of the processing steps for enabling the split-screen user interface in accordance with one example of the present invention. In step 402, the computing device operates a single application operating mode in which the processing unit displays a primary application in a full-screen or enlarged (substantially full-screen) view. Upon receiving a request for launching a second application in step 404, one or more secondary application windows are displayed in a second display panel adjacent to the first display panel associated with the first application in step 406. There are several methods the user may utilize in order to initiate the request for transitioning from single application mode to a split-screen operating mode. For example, the split-screen mode transition request may be made through user activation of a link present within the primary application (e.g., browser link in an email), which win serve to launch the secondary application in a new window that is positioned adjacently to the primary application or window. Still further, the split-screen request may also occur via activation of a link within a global menu option or an extended key press on the keyboard for example. In yet another example, the split-screen mode request may be initiated by the user dragging and dropping an application launch icon onto the active screen of the primary application (i.e., quick-launch). The operating user may then drag the edge of either application window to one side so that it may be "pinned" or remain fixed. In one example, upon dragging a desired application to one edge or corner of the user interface, the application snaps to one-third screen size while the secondary window and secondary application(s) consume the remaining two-thirds of the full screen size. However, this is but one example embodiments and other screen ratios may be used within the spirit of the invention.

Figure 5:
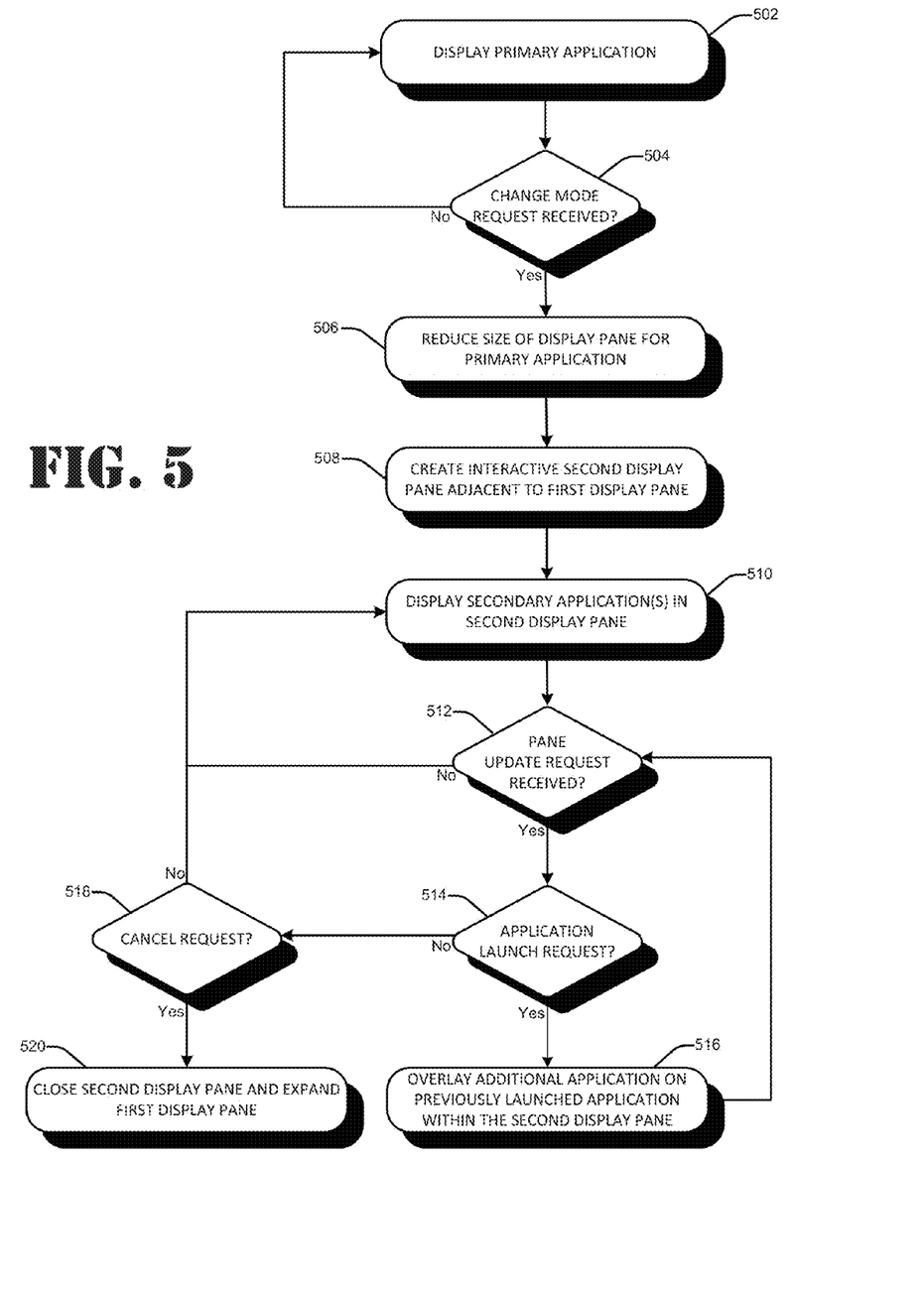
FIG. 5 is another flow chart of the processing steps for enabling the split-screen user interface in accordance with an example of the present invention.

FIG. 5 is another flow chart of the processing steps for enabling the split-screen user interface in accordance with an example of the present invention. In step 502, a primary application is shown on an associated display via the processing unit and user interface. For example, the primary application may be an email application shown within a full-screen window pane associated with the split-screen user interface. Upon receiving a mode change request from a user in step 504, the size of the display pane associated with the primary application is reduced in step 506, and a second display pane is created and positioned adjacent to the first display pane associated with the primary application in step 508. Still further, the secondary application, which was launched by the user and served to initiate the split-screen mode, is displayed by the processing unit within the second display pane adjacent to the first display pane in step 510. That is, in accordance with an example of the present invention, the split-screen environment enables the original or primary application to remain pinned to one side of the user interface (e.g., left side), while the opposite side (e.g., right side) of the user interface supports "stacks" of multiple applications within the secondary display area.

Upon receiving a pane update request from the user in step 512, a determination is made as to whether the request is to launch another application (step 514) or to close an existing application (step 518). If the request is to launch a new application, then in step 516 the processing unit executes instructions that cause a portion of the new application to overlay a portion of the existing application within the second display pane/window (FIG. 3A). According to one example, once the split-screen operating mode has been activated, any object that is assigned a global action to open another application will automatically launch the new application within secondary pane of the existing split-screen environment. Conversely, at step 520, the processing unit executes instructions that cause a second display pane to be closed and a first display pane to be expanded. Therefore, if the user desires to close one of the existing applications (within first or second display pane) or cancel the split-screen operation mode, then the processing unit executes instructions to close the window/pane associated with the target application (i.e., application to be closed) and maximizes the remaining window pane if only a single application remains active. In one example involving three or more applications opened simultaneously, the primary application may be closed so as to cause a new split-screen environment in which the topmost (within stack) or active secondary application becomes the primary application within the first window pane while the remaining application(s) become active as secondary application window(s) within the secondary window pane.

Embodiments of the present invention provide a split-screen user interface for a computing device. Moreover, many advantages are afforded by the split-screen user interface in accordance with present examples. For instance, such a configuration allows operating users to multitask within multiple applications while remaining in a full-screen viewing environment. More particularly, the user does not have to change the "focus" between multiple applications as in prior solutions while still preserving the active status of multiple applications and maximizing the available display area of the user interface. Moreover, the split-screen user interface of the present examples provides a simple and intuitive method for entering and exiting a split-screen operating mode that requires minimal effort from the operating user.

Furthermore, while the invention has been described with respect to exemplary embodiments, one skilled in the art will recognize that numerous modifications are possible. For example, although the first and second display windows are shown as vertically-arranged, the invention is not limited thereto. For example, the first and second display window areas may be arranged horizontally such that the first display window is positioned above the second display window. Moreover, the second display pane may include more than the three application windows shown in the present figures. By the same measure, the first display pane may comprise of one or more "stacked" application windows. Thus, although the invention has been described with respect to exemplary embodiments, it will be appreciated that the invention is intended to cover all modifications and equivalents within the scope of the following claims.

What is claimed is:

1. A computer-implemented method for providing a split-screen user interface on a device, the method comprising:
    displaying content of a primary application in a first viewing mode on at least a portion of a display associated with the device;
    receiving a request from a user to launch a second application of a particular type, the request received in response to the user activating an object within the primary application displayed as a first portion of the content of the primary application, wherein the particular type of the second application is determined based on the object within the primary application;
    transitioning, in response to the received request to launch the second application, from the first viewing mode to a split-screen viewing mode, wherein the split-screen viewing mode shows the content of the primary application within a first display area and shows content of the second application within a second display area adjacent to the first display area.

2. The method of claim 1, wherein the object displayed within the primary application is a link, and the user activating the object includes the user activating the link.

3. The method of claim 1, wherein a plurality of applications shown within the second display area is automatically closed when new content associated with the primary application is activated.

4. The method of claim 1, wherein when a new application is launched based on user activation of an action object within at least one application of a plurality of applications shown within the second display area, the new application is opened and added to the stack of the plurality of applications shown within the second display area.

5. A non-transitory computer readable storage medium having stored executable instructions for providing a split-screen user interface on a device, that when executed by a processor, causes the processor to:
    display content of a primary application in a single application mode on at least a portion of a display associated with the device;
    based on receiving a request to launch a second application of a particular type, the request received in response to the user activating an object within the primary application displayed as a first portion of the content of the primary application, and the particular type of the second application being determined based on the object within the primary application, received from a user:
    launch to a split-screen mode; and
    transition from the single application mode to the split-screen mode, wherein the split-screen mode shows the content of the primary application within a first display area and shows content of the second application within a second display area adjacent to the first display area.

6. The computer readable storage medium of claim 5, wherein a plurality of applications displayed within the second display area is automatically closed when new content associated with the primary application is activated.

7. The computer readable storage medium of claim 5, wherein when a new application is launched based on user activation of an action object of at least one application of a plurality of applications within the second display area, the new application is opened and added to the stack of the plurality of applications within the second display area.

8. An apparatus for providing a split-screen user interface on a portable electronic device, the apparatus comprising:

means for displaying content of a primary application in a single application mode on at least a portion of a display associated with the device;

means for receiving a mode change request from a user to launch to a split-screen mode for enabling simultaneous display of multiple applications, wherein the mode change request represents user activation of a link within the primary application displayed as a first portion of the content of the primary application, the link requiring launch of a second application of a particular type, wherein the particular type of the second application is determined based on the link within the primary application; and means for transitioning from the single application mode to a split-screen mode based on the mode change request such that the content of the primary application is shown within a first display area and content of the second application is shown within a second display area adjacent to the first display area.

9. The method of claim 1, further comprising: transitioning, in response to the user activating another object within the primary application displayed as a second portion of the content of the primary application, back to the first viewing mode, wherein the first viewing mode is a full screen mode.

10. The computer readable storage medium of claim 5, further comprising: instructions that, when executed by the processor, cause the processor to transition, in response to the user activating another object within the primary application displayed as a second portion of the content of the primary application, back to the single application mode, wherein the single application mode is a full screen mode.

11. The apparatus of claim 8, further comprising: means for transitioning, in response to the user activating another link within the primary application displayed as a second portion of the content of the primary application, back to the single application mode, wherein the single application mode is a full screen mode.

12. An apparatus configured for providing a split-screen user interface on a device, the apparatus comprising:
at least one processor; and
a memory coupled to the at least one processor,
wherein the at least one processor is configured to:
display content of a primary application in a first viewing mode on at least a portion of a display associated with the device;
receive a request from a user to launch a second application of a particular type, the request received in response to the user activating an object within the primary application displayed as a first portion of the content of the primary application, wherein the particular type of the second application is determined based on the object within the primary application;
transition, in response to the received request to launch the second application, from the first viewing mode to a split-screen viewing mode, wherein the split-screen viewing mode shows the content of the primary application within a first display area and shows content of the second application within a second display area adjacent to the first display area.

13. The apparatus of claim 12, wherein the at least one processor is further configured to transition, in response to the user activating another object within the primary application displayed as a second portion of the content of the primary application, back to the first viewing mode, wherein the first viewing mode is a full screen mode.

* * * * *